United States Patent [19]
Takahashi et al.

[11] Patent Number: 4,895,433
[45] Date of Patent: Jan. 23, 1990

[54] VISUAL FIELD CONVERTING OPTICAL SYSTEM

[75] Inventors: Susumu Takahashi, Hachiouji; Minoru Okabe, Musashino; Akira Hasegawa; Kimihiko Nishioka, both of Hachiouji, all of Japan

[73] Assignee: Olympus Optical Co., Ltd., Tokyo, Japan

[21] Appl. No.: 303,980

[22] Filed: Jan. 31, 1989

Related U.S. Application Data

[63] Continuation of Ser. No. 15,360, Feb. 17, 1987, abandoned.

[30] Foreign Application Priority Data

Feb. 17, 1986 [JP] Japan ................................. 61-30980

[51] Int. Cl.⁴ ..................... G02B 1/00; G02B 23/24; G02B 5/04
[52] U.S. Cl. ............................ 350/413; 350/506; 350/436; 350/447; 350/286
[58] Field of Search ............ 350/413, 506, 286, 96.28, 350/96.31, 436, 447, 573, 574; 128/4, 5, 6, 7, 8, 9

[56] References Cited

U.S. PATENT DOCUMENTS

| | | | |
|---|---|---|---|
| 3,859,103 | 1/1975 | Yoshiyagawa et al. | 350/413 |
| 4,215,914 | 8/1980 | Muchel et al. | 350/413 |
| 4,460,241 | 7/1984 | Cohen | 350/96.18 |
| 4,473,273 | 9/1984 | Hodge | 350/96.31 |
| 4,516,826 | 5/1985 | Pack | 350/96.31 |
| 4,641,927 | 2/1987 | Prescott et al. | 350/413 |
| 4,647,159 | 3/1987 | Baba | 350/413 |
| 4,723,843 | 2/1988 | Zobel | 350/413 |
| 4,735,491 | 4/1988 | Takahashi | 350/413 |

FOREIGN PATENT DOCUMENTS 47-28057 7/1972 Japan .

Primary Examiner—Bruce Y. Arnold
Assistant Examiner—Ronald M. Kachmarik
Attorney, Agent, or Firm—Cushman, Darby & Cushman

[57] ABSTRACT

A visual field converting optical system comprising an inhomogeneous medium lens or a prism in which refractive index is linearly changed in a direction different from that of travel of light, in order to be able to perform a visual field conversion with a simple and compact configuration, without generating aberration.

19 Claims, 8 Drawing Sheets

VISUAL FIELD CONVERTING OPTICAL SYSTEM

This is a continuation of Application No. 07/015,360, filed Feb. 17, 1987, which was abandoned upon the filing hereof.

BACKGROUND OF THE INVENTION

1. Field of the invention

The present invention relates to a visual field converting optical system disposed inside flexible or non-flexible endoscopes.

2. Description of the prior art

A conventional visual field converting optical system of this type may utilize fundamentally a reflecting function of a prism or a refracting function of a prism or use an inhomogeneous medium lens.

The optical system utilizing the reflecting function, as shown in, for example, FIG. 1, comprises a plano-concave lens 1, a prism 2 and an objective unit 3 disposed in the distal end portion of an endoscope and an image guide 4 to convert a traveling direction of light into another through the prism 2. Further, as shown in FIG. 2, another optical system arranges prisms 6, 7 in an image transmitting portion 5 of a non flexible endoscope to turn upward a traveling direction of light at an angle of 45° so that the position of an eyepiece portion 8 is convenient for observation. These visual field converting optical systems of the reflection type mentioned above, however, have disadvantages that the number of optical elements to be required is increased and consequently an optical configuration is liable to be complicated, though an angle of deflection can be made considerably wide.

Also, the optical system applying the refracting function, as shown in, for example, FIG. 3, is composed of a prism 9 with a concave lens and an objective unit 3 arranged in the distal end portion of an endoscope and an image guide 4 to deflect a light beam through the prism 9. Such an optical system is often used when the angle of deflection is 20° or less. Further, FIG. 4 shows an example utilizing the refracting function in which an optical axis is inclined in a visual field direction at an angle of approximately 10° with a direction of straight view. This example, which takes account of use of endoscopes in water, is provided with a cover lens 10 arranged perpendicular to the optical axis in front of a prism 9 with a concave lens so that a visual field direction can also be obtained in water in the same manner as in air. However, these visual field converting optical systems of the refraction type create difficulties of distortion and astigmatism caused by the refracting function.

The optical system utilizing both the reflecting and refracting functions, as illustrated in, for example, FIG. 5, has a prism 2 and a prism 9 with a concave lens arranged in the distal end portion of a side-view type endoscope as a back-view type. This visual field converting optical system has problems that the prism 9 projects inevitably into the outside from the side of the endoscope due to its wedge shape and, in case a cover glass is provided to eliminate the projection of the prism, the distal end portion of the endoscope becomes larger in diameter.

The optical system using an inhomogeneous medium lens is described in, for example, Japanese Patent Publication No. Sho 47-28057. This system, as shown in FIGS. 6A and 6B, includes an inhomogeneous medium lens 11 in which refractive index distribution exhibits square distribution (FIG. 6B) and its center axis is curved (FIG. 6A). However, it is very difficult as a matter of fact to make a lens with such refractive index distribution that the center axis is curved. Also, in order to incorporate the lens in the distal end portion of the endoscope, it is necessary to miniaturize the endoscope itself in such a manner that a light beam is turned in a predetermined direction at a short distance. When the extent of the curve of the center axis as well as the variation of the refractive index distribution is made larger for this purpose, the deviation of the position between the centers of the image and the distribution is increased and the resultant image is distorted. Therefore, the above system faces a difficult problem that it is impossible to make large the variation of the refractive index distribution and the curve of the center axis. It is needless to say that the lens with a linear center axis and the refractive index distribution of square distribution in the shape of a wedge has a problem that it is of no practical use since an image forming function with the square distribution is caused asymmetrically with respect to the center axis, in addition to aberration caused by the refracting function on the exit face of the lens, and thereby aberration is largely developed in a direction perpendicular to the optical axis at an image forming position.

SUMMARY OF THE INVENTION

In view of the above-mentioned problems, a primary object of the present invention is to provide a visual field converting optical system which has a simple formation, eliminates the projection of a component from the side of the distal end portion of a flexible or non-flexible endoscope and is difficult to cause aberration.

Another object of the present invention is to provide a visual field converting optical system for flexible or non-flexible endoscopes having a simple formation which allows the correction of aberration.

Still another object of the present invention is to provide a visual field converting optical system for flexible or non-flexible endoscopes having a wide angle of view and causing little aberration.

According to the present invention, an optical element having refractive index distribution provided in an optical path to convert a visual field into another is formed so that the refractive index distribution is linearly changed in a direction different from the direction of the optical path at a principal portion of the element. Thereby, a visual field converting optical system having a simple formation and minimizing the occurrence of aberration can be provided.

These and other objects as well as the features and the advantages of the present invention will be apparent from the following detailed description of the preferred embodiment when taken in conjunction with the accompanying drawings.

DESCRIPTION OF THE PREFERRED EMBODIMENTS

Referring to FIGS. 7A through 10, before the embodiments of the present invention are explained, description will first be given as to why a visual field converting optical system having a simple configuration and causing no aberration is materialized when such an optical element that refractive index is linearly changed is used as a visual field converting optical element.

Figure 7A:
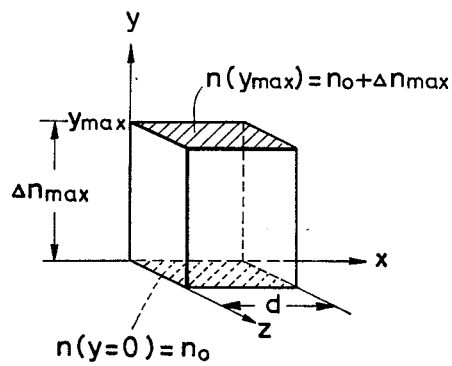
FIG. 7A is a view for explaining a basic formation of a visual field converting optical element used in an optical system according to the present invention.
Figure 7B:
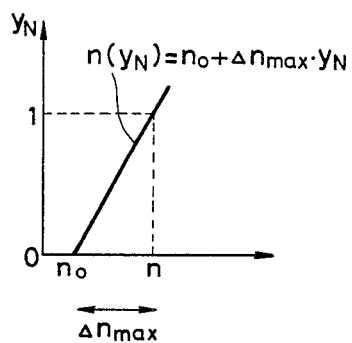
FIG. 7B is a diagram showing the refractive index distribution of the optical element illustrated in FIG. 7A.
Figure 8:
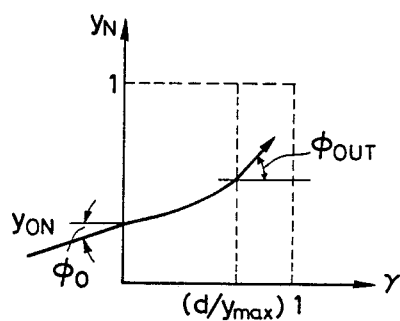
FIG. 8 is a view for explaining the relationship between the angles of incidence and exit of a light ray with respect to the optical element shown in FIG. 7A.
Figure 9:
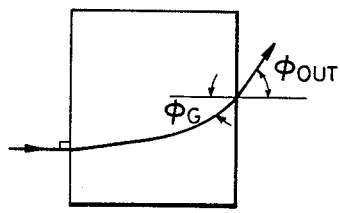
FIGS. 9 and 10 are views showing traveling paths of a light ray in typical shapes different from each other, of the optical element having the refractive index distribution as illustrated in FIG. 7B, respectively.

Now consider an optical element with an inhomogeneous medium which is of a rectangular parallelepiped being $y_{max}$ in height and d in thickness and causes refractive index to be linearly changed in a y-direction, as shown in FIGS. 7A and 7B. In this optical element, it is assumed that the refractive index, which is constant in the x-y plane, is $n_0$ in the lower plane and is $n_0 + \Delta n_{max}$ in the upper plane. For the simplification of the following explanation, a standardized coordinate system (FIG. 8) is made by dividing each of the height y and the thickness d by $y_{max}$. Then, assuming that an exit angle is $\phi_{out}$ when a light beam incident upon a plane of incidence with an incident angle $\phi_0$ at a position represented by $y_{ON}$ on the plane thereof is emitted from a plane of exit, the exit angle $\phi_{out}$ can be obtained from the following formula:

$$\sin\phi_{out} = \sin\phi_0 \left( \sum_{k=0}^{\infty} \frac{1}{(2K)!} \left( \frac{\Delta n_{max} \cdot \gamma}{C_0} \right)^{2K} \right) + \quad (1)$$

$$n(y_{ON}) \left\{ \sum_{k=0}^{\infty} \frac{1}{(2K+1)!} \left( \frac{\Delta n_{max} \cdot \gamma}{C_0} \right)^{2K+1} \right\}$$

Here, $n(y_{ON}) = n_0 + \Delta n_{max} \cdot y_N$ ($0 \leq y_N < 1$), $$\gamma = \frac{d}{y_{max}},$$

and $C_0 = \{n(y_{ON})^2 - \sin^2\phi_0\}^{\frac{1}{2}}$.

Now, assuming that the incident angle $\phi_0 = 0$, $C_0 = n(y_{ON})$ and the above formula (1) is expressed by $$\sin\phi_{out} = \Delta n_{max} \gamma + \frac{1}{6} (\Delta n_{max} \gamma)^3 \frac{1}{n(y_{ON})^4} + \quad (2)$$

$$\frac{1}{120} (\Delta n_{max} \gamma)^5 \frac{1}{n(y_{ON})^6} +$$

Then, by calculating $\Delta n_{max} \cdot \gamma$, $\frac{1}{6}(\Delta n_{max} \cdot \gamma)^3 \cdot \frac{1}{n(y_{ON})^4}$ and $$\frac{1}{120} (\Delta n_{max} \cdot \gamma)^5 \frac{1}{n(y_{ON})^6}$$

in the above formula (2) with respect to the cases of $\gamma = 1$ and $\gamma = 0.2$ as $n_O = 1.5$, $\Delta n_{max} = 0.2$ and the refractive index of the incident position $n(y_{ON} = 0) = 1.5$, the following table can be obtained:

| | $\gamma = 1$ | | $\gamma = 0.2$ | |
|---|---|---|---|---|
| | | ratio | | ratio |
| $\Delta n_{max} \cdot \gamma$ | 0.2 | 1 | 0.04 | 1 |

| $\Delta n_{max} \cdot \gamma$ | $\gamma = 1$ | | $\gamma = 0.2$ | |
|---|---|---|---|---|
| | 0.2 | ratio 1 | 0.04 | ratio 1 |
| $\frac{1}{6} (\Delta n_{max} \cdot \gamma)^3 \cdot \frac{1}{n(y_{ON})^4}$ | $2.63 \times 10^{-4}$ | $1.30 \times 10^{-3}$ | $2.10 \times 10^{-6}$ | $5.25 \times 10^{-5}$ |
| $\frac{1}{120} (\Delta n_{max} \cdot \gamma)^5 \cdot \frac{1}{n(y_{ON})^6}$ | $2.34 \times 10^{-7}$ | $1.17 \times 10^{-5}$ | $7.49 \times 10^{-11}$ | $1.87 \times 10^{-9}$ |
| Incident angle $\phi_{out}$ obtained from the sum of three terms in formula (2) | 11.55° | | 2.29° | |

As will be evident from the above calculations, in the optical elements having practical shapes, the values of the second and third terms in the above formula (2) are extremely small as compared with that of the first term, so that $\sin\phi_{out} \approx \Delta n_{max} \cdot \gamma$ can be written. It is therefore understood that the exit angle $\phi_{out}$ is independent of the incident position $y_{ON}$. This means that, in the optical element in which the refractive index is linearly changed, a beam of parallel light incident on a surface parallel to a direction in which the refractive index is changed remains parallel even when emitted from the exit face. That is to say, it is understood that the use of such an optical element allows only the direction of the light to be changed without causing converging and diverging functions when the light passes through the element.

Although the first term in the above formula (1) does not show a zero except the case of the incident angle $\phi_0 = 0$ and has an effect on the exit angle $\phi_{out}$, it is hardly affected by the incident position similar to the second term. That is, the incident parallel light is emitted, independently of the incident angle, from the exit face as a parallel beam.

Figure 10:
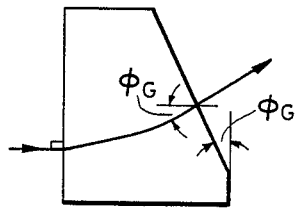

It will be obvious from the above explanation that when such an optical element that the refractive index is linearly changed is used as visual field converting optical components, the parallel light is emitted from the exit face as it is after passing through the element and as such a visual field converting optical system causing no aberration is realized. Now, as an idea for using advantageously the function to convert the direction of light through an inhomogeneous medium element, it is proposed that an exit end face of the element is obliquely cut so that an exit light is emitted from the exit end face perpendicular to the direction thereof. That is, as will be evident from FIGS. 9 and 10, when the exit end face of the optical element is cut in such a way that a cutting angle is equal to an angle $\phi_G$ made in the inhomogeneous medium at a point where the light is emitted, the optical element can be formed so that the light beam is emitted at right angles to the exit end face. Therefore, if a prism is employed in such a shape as shown in FIG. 10, the visual field direction of the optical system can remain constant even in such a case that a medium provided between the object and the prism is changed from air into water.

Next, description will hereunder be given as to various embodiments of a visual field converting optical system according to the present invention, making use of the inhomogeneous medium optical element having the properties mentioned above. In each of these embodiments, the same members as in the above conventional examples are used to designate the same reference numerals.

Figure 4:
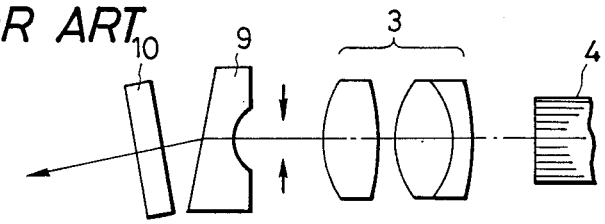
Figure 5:
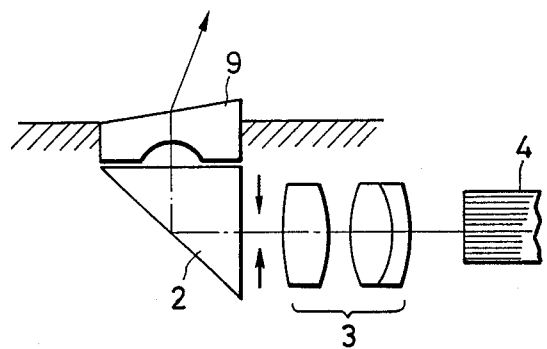
Figure 6B:
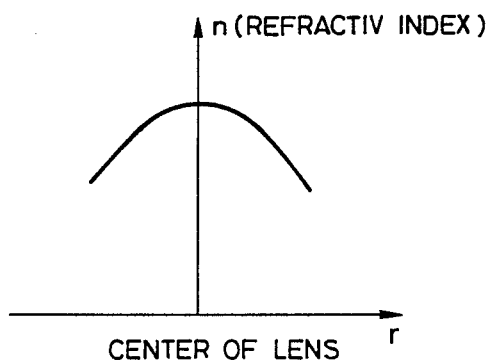
FIG. 6B is a diagram showing refractive index distribution of the optical element illustrated in FIG. 6A.
Figure 6A:
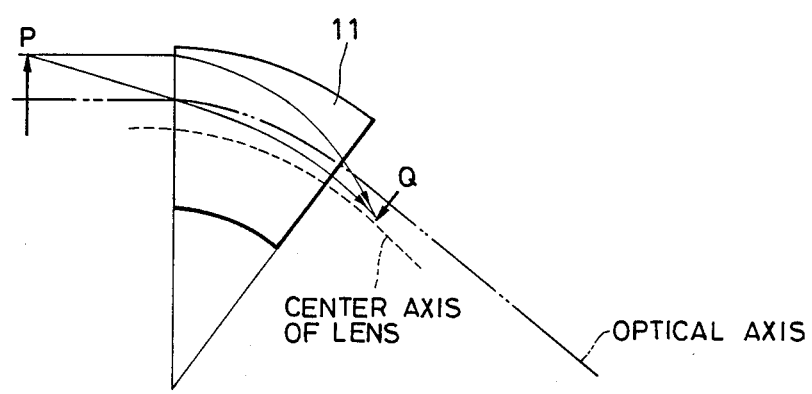
FIG. 6A is a view showing a conventional example, different from those shown in FIGS. 1 through 5, of a visual field converting optical element.
Figure 11A:
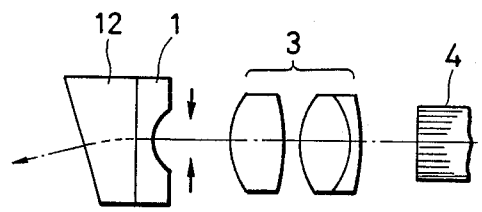
FIGS. 11A and 11B are views showing the principal configuration of the first embodiment of a visual field converting optical system according to the present invention and the refractive index distribution of a visual field converting prism used therein, respectively.
Figure 11B:
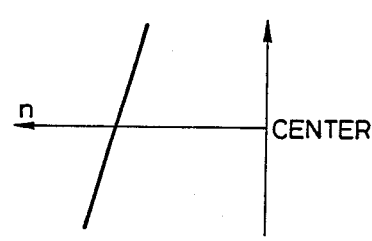

FIGS. 11A and 11B show the configuration of the first embodiment and the refractive index distribution of a visual field converting prism 12 used therein, respectively. The prism 12 has a wedge shape and is arranged, as previously mentioned, so that the inhomogeneous distribution is linearly changed and the optical axis is perpendicular to the front face of the prism. Then, the arrangement is also made so that light incident perpendicularly on the incident face of the prism 12 comprising such an inhomogeneous medium is curved therein and, at the exit end face, is emitted at right angles therewith. As such, when the optical system is used in water and air, the visual field direction remains constant. Also the light beams emitted from higher and lower positions than that of the optical axis are turned downward and the angle of view of the system is held in almost the same manner as a state that the conversion of visual field is not performed. Further, although the prism 9 with the concave lens and the cover glass 10 of the conventional example shown in FIG. 4 are divided into two parts, they are constituted, in an embodiment of the present invention, as one part comprising a plano-concave lens 1 and a prism 12 and therefore the lens configuration is made simple.

Also, as shown in FIG. 11B, the refractive index distribution of the prism 12 is such that, in principle, the refractive index is low on the side larger in thickness of the prism in a direction parallel to the optical axis and is high on the side smaller in thickness, between which it is almost linearly changed. When the refractive index distribution of a lens component is linear, the image forming function is not produced inside the component as mentioned before and alternatively only the angle deflecting function is brought about, so that the occurrence of various aberrations deteriorating an image is minimized. In such a case, it is needless to say that an image forming light bundle needs to be almost parallel in front of the plano-concave lens 1 (on the left hand of FIG. 11A). That is, when the rays of a light bundle are parallel to each other, the aberration is generated to the lowest minimum in the visual field conversion.

However, in case distortion and astigmatism are produced in a direction perpendicular to the optical axis when the visual field conversion is performed at the position where an angle of view is large, it is also possible to correct the refractive index distribution so as to be non-linear in the circumference of the visual field.

Further, since the angle deflecting function is brought about if the direction of the refractive index distribution is only different from that of the optical path, it need not have to be perpendicular to the direction of the optical path, in particular, as described above.

Figure 12:
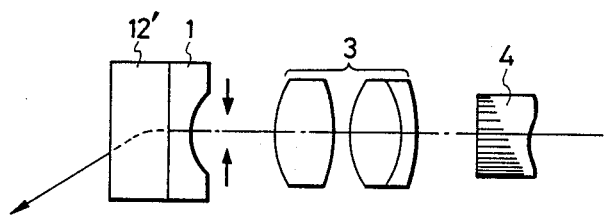
FIGS. 12, 13 and 14 are views showing the principle configuration of modified examples, different from each other, of the first embodiment, respectively.
Figure 13:
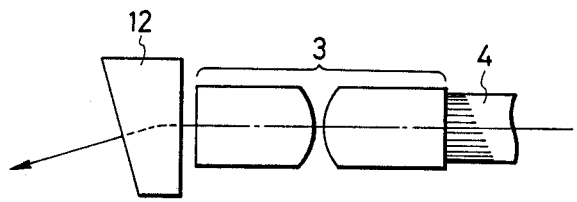
Figure 14:
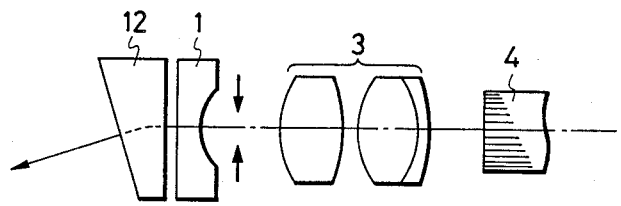

FIGS. 12, 13 and 14 shows modified examples, different from each other, of the first embodiment. That is, the modified example shown in FIG. 12 differs from the first embodiment in respect that a prism 12' comprising an inhomogeneous medium is used which an incident face is not inclined with regard to an exit face or is not provided perpendicular to the optical axis. Since the refractive index distribution of the prism 12' is as shown in FIG. 11B, the functions and advantages of the visual field converting optical system shown in FIG. 12 are the same as those of the first embodiment.

The modified example illustrated in FIG. 13 is distinct from the first embodiment in that the plano-concave lens 1 is not employed. Also in this modified example, the prism 12 has such refractive index distribution as shown in FIG. 11B and the functions and advantages of the visual field converting optical system are the same as those of the first embodiment, so that a detailed description is omitted.

The modified example shown in FIG. 14 is different from the first embodiment in that the plano-concave lens 1 and the prism 12 are not cemented to each other and same air space is provided between them. Also in this example, since functions and advantages of the visual field converting optical system are substantially the same as those of the first embodiment, its detailed explanation is omitted.

Figure 15A:
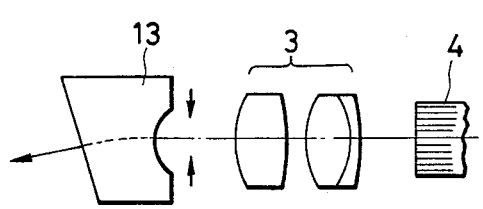
FIGS. 15A and 15B are views showing the configuration of a further modified example of the first embodiment and the refractive index distribution of a prism used therein, respectively.
Figure 15B:
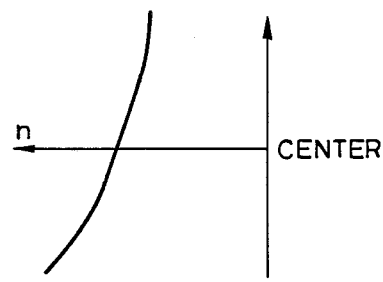

FIGS. 15A and 15B show the configuration of a prism 13 with a concave lens in which the visual field converting prism 12 is constituted integral with the plano-concave lens 1 as a further modified example of the first embodiment and the refractive index distribution of the prism 13, respectively. In this case, as shown in FIG. 15B, the refractive index distribution of a principal portion, that is, a central portion of the prism 13 is linear. However, the optical path increases in length and is curved excessively on the side larger in thickness in a direction parallel to the optical axis of the prism 13 and positive distortion is liable to be generated, so that the distribution is corrected by reducing the inclination of the refractive index in the circumference. Also, on the side smaller in thickness, the optical path decreases in length and is hard to be curved and negative distortion is liable to occur, so that the distribution is corrected by increasing the inclination of the refractive index in the circumference. Further, since ability for correction is also added, by the integration of the prism 13, as the inhomogeneous medium lens on an air contacting surface of the concave lens part of the prism 13, the number of degrees of freedom is increased to be effective.

Figure 16A:
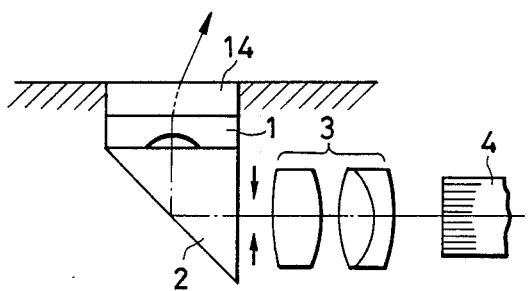
FIGS. 16A and 16B are views showing the principal configuration of the second embodiment according to the present invention and the refractive index distribution of an inhomogeneous medium lens used therein, respectively.
Figure 16B:
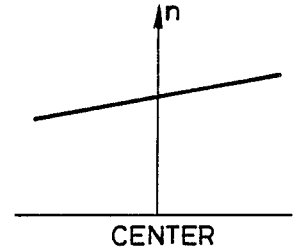

FIGS. 16A and 16B show the configuration of the second embodiment and the refractive index distribution of an inhomogeneous medium lens 14, respectively. This is one of the most basic embodiments of the present invention in which the inhomogeneous medium lens 14 is cemented to the plano-concave lens 1. The inhomogeneous medium lens 14, as illustrated in FIG. 16A, is such that the refractive index is high in the direction in which the optical axis is intended to turn, and it is almost linearly changed. In this embodiment, the configuration is simple and the upper surface of the lens 14 is flat, with the result that the projection on the side of the distal end portion of endoscopes is not produced, which is favorable for endoscopes. Further, the case of changing the visual field direction with the inhomogeneous medium lens 14 brings about a much little amount of aberration as compared with the conventional method of turning the optical axis with the refracting function at one point. This reason is that in the case of use of the inhomogeneous medium, a light beam can be continuously curved.

Figure 17:
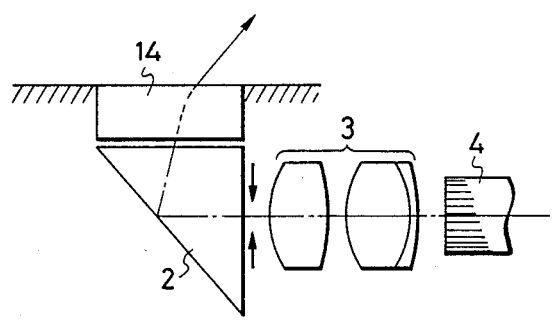
FIG. 17 is a view showing the principal configuration of a modified example of the second embodiment.

FIG. 17 shows a modified example of the second embodiment. This modified example is different from the second embodiment in that the arrangement is made so that the plano-concave lens 1 is eliminated and an angle of reflection caused by the prism 2 is not a right angle. However, since the inhomogeneous medium lens 14 has such refractive index distribution as shown in FIG. 16B, the functions and advantages of the visual field converting optical system is the same as those of the second embodiment except that the configuration is further simple as compared with the second embodiment.

Figure 18A:
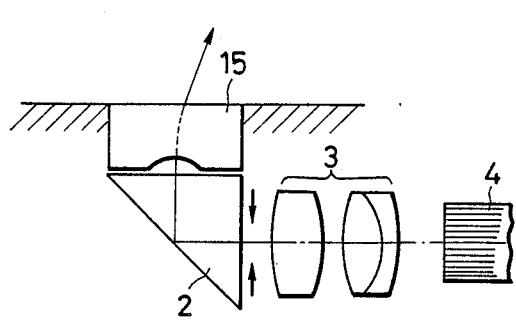
FIGS. 18A and 18B are views showing the principal configuration of another modified example of the second embodiment and the refractive index distribution of a lens thereof, respectively.
Figure 18B:
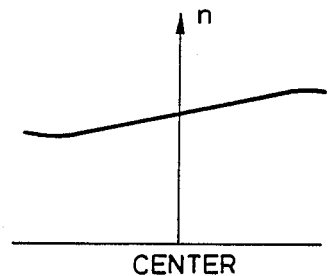

In FIGS. 18A and 18B are shown the configuration of an inhomogeneous medium lens 15 with a concave lens in which the inhomogeneous medium lens 14 is constituted integral with the plano-concave lens 1, as another modified example of the second embodiment, and the refractive index distribution of the lens 15, respectively. This is intended to change the refractive index distribution in the circumference in order to correct aberration produced in the circumference when the refractive index distribution is linearly, that is, evenly changed.

Figure 19:
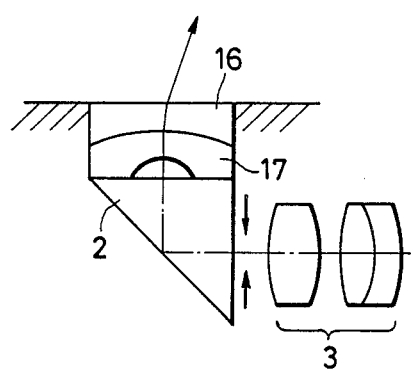
FIGS. 19 and 20 are views showing the principal portions of still another modified examples, different from each other, of the second embodiment, respectively.

FIG. 19 shows, as still another modified example of the second embodiment, a principal portion of the configuration in which a plano-concave inhomogeneous medium lens 16 is cemented to a concave lens 17 of homogeneous medium. In such a case, the lens 16 is constituted so that the refractive index is changed in one direction to perform the visual field conversion.

Figure 20:
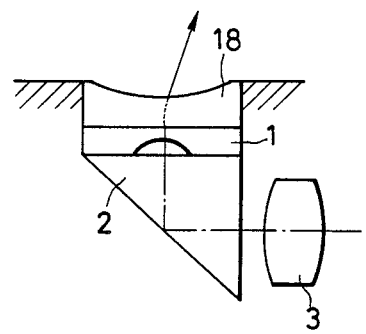

FIG. 20 shows, as a still further modified example of the second embodiment, a principal portion of the configuration in which a plano-concave inhomogeneous medium lens 18 is cemented to the plano-concave lens 1 of homogeneous medium.

Figure 21A:
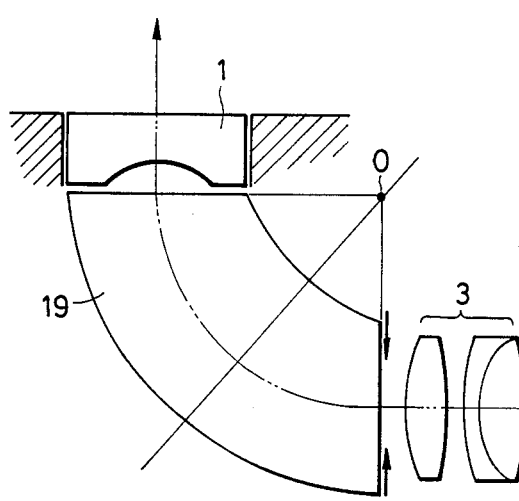
FIGS. 21A and 21B are views showing the principal configuration of the third embodiment according to the present invention and the refractive index distribution of an inhomogeneous medium lens used therein, respectively.
Figure 21B:
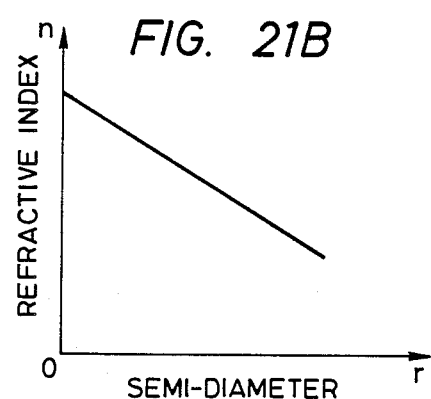

FIGS. 21A and 21B show the configuration of the third embodiment and the refractive index distribution of an inhomogeneous medium prism 19 used therein, respectively. This configuration is made so that the visual field direction is converted at an angle of 90° through the prism 19. As illustrated in FIG. 21B, the prism 19 has the center of the refractive index distribution on an axis passing through a point O and perpendicular to this figure so that the refractive index distribution is almost linearly changed in accordance with a distance in a radial direction. In this embodiment, the visual field direction can be arbitrarily changed, without being limited to an angle of 90°, by selecting a cutting position of the prism 19.

Figure 22:
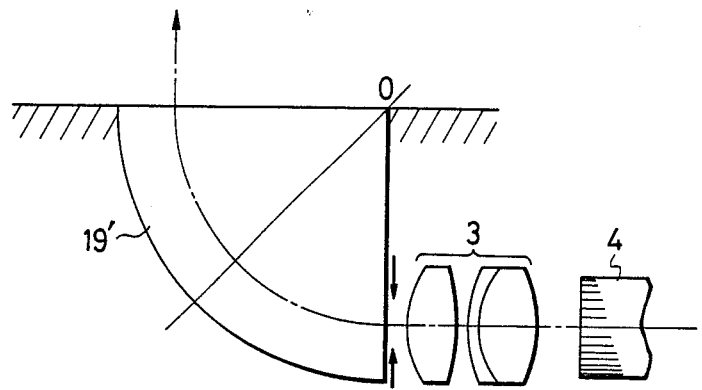
FIG. 22 is a view showing the principal configuration of a modified example of the third embodiment.

FIG. 22 shows a modified example of the third embodiment. This modified example is different from the third embodiment in that the plano-concave lens 1 is omitted and an inhomogeneous medium prism 19' is not constituted in an arc shape, but in a sector. However, the inhomogeneous medium prism 19' has the refractive index distribution similar to that of the prism 19 shown in FIG. 21B and as such the functions and advantages of the visual field converting optical system is the same as those of the third embodiment except that the configuration of the example is further simple as compared with the third embodiment.

Figure 1:
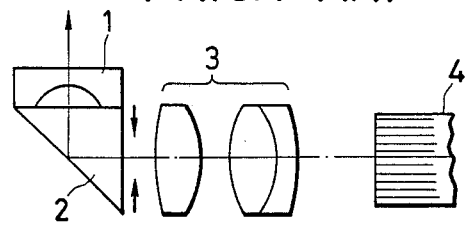
FIGS. 1 through 5 are views showing principal configuration of conventional examples, different from each other, of a visual field converting optical system for endoscopes, respectively.
Figure 2:
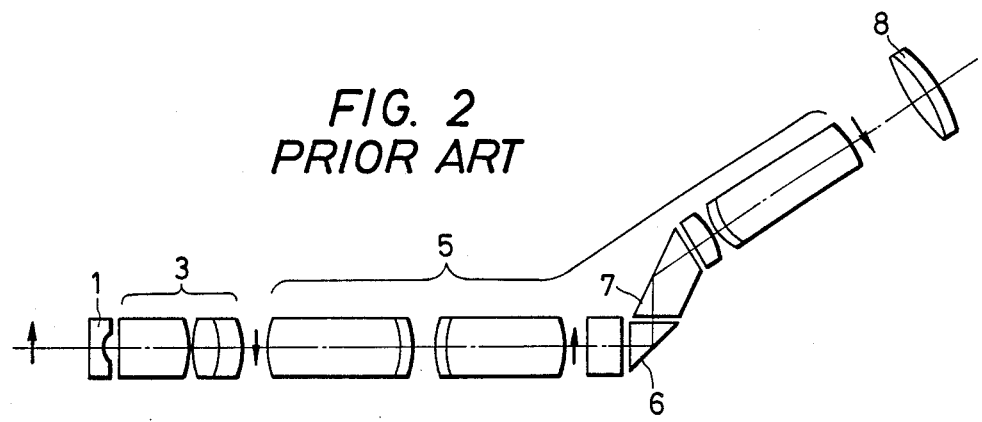
Figure 3:
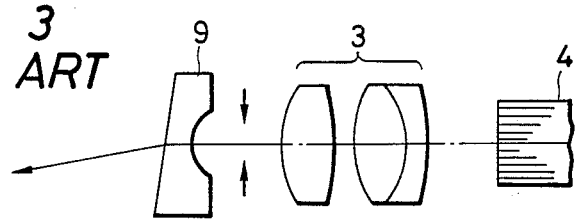
Figure 23B:
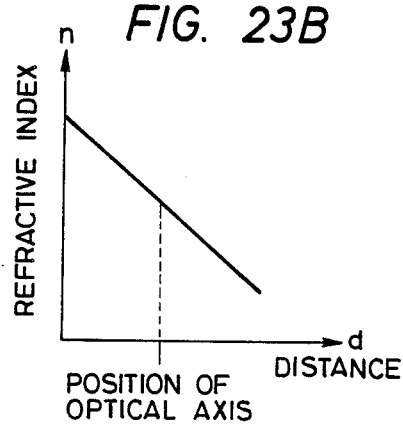
FIGS. 23A and 23B are views showing the configuration of the fourth embodiment according to the present invention and the refractive index distribution of an inhomogeneous medium prism used therein, respectively.
Figure 23A:
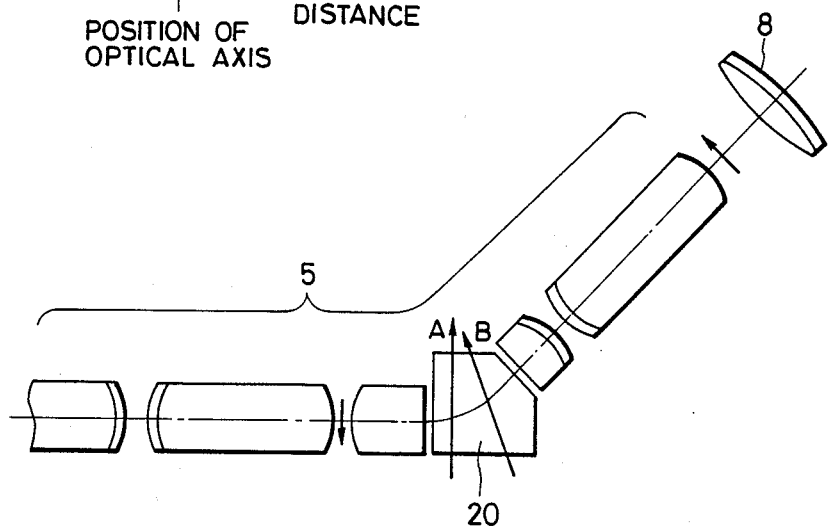

In FIGS. 23A and 23B are shown the configuration of the fourth embodiment and the refractive index distribution of an inhomogeneous medium prism 20, respectively. This embodiment is such that the inhomogeneous medium prism 20 is arranged in the light transmitting portion 5 of the non-flexible endoscope to provide upward the eyepiece portion 8 at an angle of 45°. In the embodiment, it is only necessary to use a single optical element as a component required for the angle deflection, so that the configuration is more compact than that of the conventional example shown in FIG. 2. Also, in case the refractive index distribution of the prism 20 has the inclination of refractive index which is almost linear in the direction of an arrow A perpendicular to the optical axis lying on the incident side, or in case it has the inclination of refractive index which is almost linear in the direction of an arrow B inclined with respect to the optical axis lying on the incident side, if, in either case, the directions of the optical axis and the refractive index distribution before and after the visual field conversion are different from each other, the visual field conversion can be carried out.

Figure 24A:
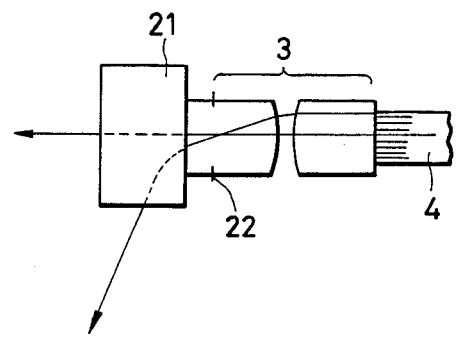
FIGS. 24A and 24B are views showing the principal configuration of the fifth embodiment according to the present invention and the refractive index distribution of an inhomogeneous medium lens used therein, respectively.
Figure 24B:
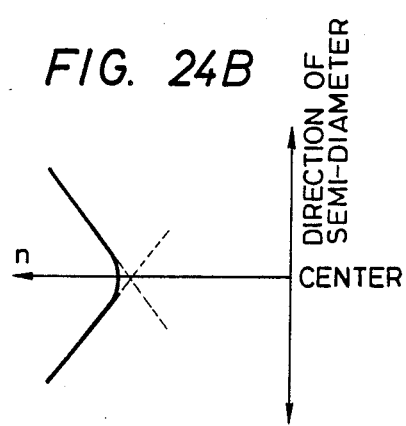

FIGS. 24A and 24B show the configuration of the fifth embodiment and the refractive index distribution of an inhomogeneous medium lens 21, respectively. In this case, the lens 21 has almost conical refractive index distribution from the center toward the circumference as shown in FIG. 24B. As a result, light passing through the center of the visual field is subjected to the converging function due to a cone point of the conical refractive index distribution, while light passing through the circumference of the visual field is subjected to only the function of deflection as in the first and second embodiments mentioned above. This reason is that an aperture stop 22 provided on the incident side is positioned rearward of the lens 21 and the light coming from the circumference of the visual field does not pass through the cone point of the conical refractive index distribution. It is therefore required that the light passing through the center of the visual field is not used and the light passing through the circumference of the visual field is used for the observation of an object.

Figure 25A:
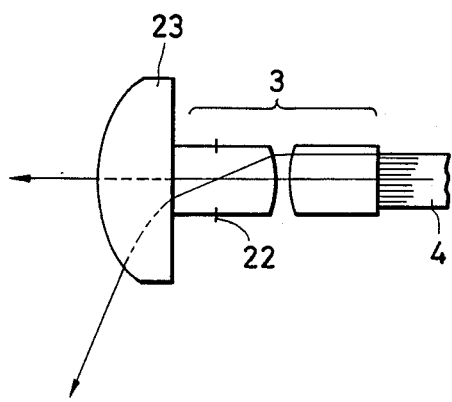
FIGS. 25A and 25B are views showing the principal configuration of a modified example of the fifth embodiment and the refractive index distribution of an inhomogeneous medium lens used therein, respectively.
Figure 25B:
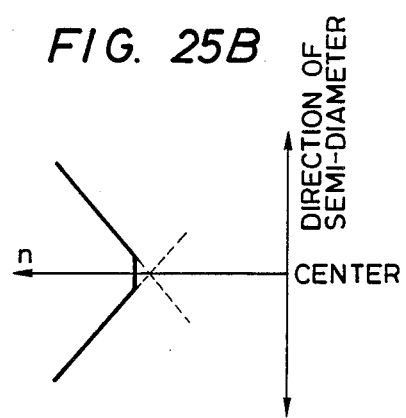

FIGS. 25A and 25B show the configuration of a modified example of the fifth embodiment and the refractive index distribution of an inhomogeneous medium lens 23, respectively. The lens 23 is a plano-convex lens and the refractive index distribution has a truncated cone shape as shown in FIG. 25B. The position of the aperture stop 22 provided on the incident side is given rearward of the lens 23, as is the case with the fifth embodiment, so that the converging function due to the refractive index distribution is not caused in the circumference of the visual field and only the function of deflection is brought about. Therefore, although the image of the center of the visual field cannot be used, the image of the circumference of the visual field can be observed, as an image having a wide angle of view, by the function of deflection. Also, if the curvature of the convex surface of the lens 23 is varied to be perpendicular to the light beam passing through the circumference, the image can be observed with a constant angle of view in water and air.

As mentioned above, the visual field converting optical system according to the present invention has important advantages in practical use that, in addition to the fact that the configuration is simple and the optical element does not project into the outside from the side of the distal end portion of the flexible or non-flexible endoscope, aberration is hard to be generated and the correction of aberration can be made by slightly changing the linearity of the refractive index distribution. Furthermore, when the optical element having conical refractive index distribution is incorporated in the distal end portion of the flexible or non-flexible endoscope, an angle of view can be varied at a minimum of generation of aberration. As a result, the present invention has also an advantage that flexible or non-flexible endoscopes having a wide angle of view convenient for the observation of the inside of a tube can be realized.

What is claimed is:
1. An image forming optical system for forming an object image on a predetermined image forming position, comprising:
    an image forming lens; and
    a gradient refractive index optical element, said optical element having a refractive index distribution in which the refractive index is linearly changed in a direction crossing an optical axis of said image forming lens at the region including a center part of said optical element which is located on said optical axis.

2. An image forming optical system according to claim 1, wherein:
    said optical element has an incident face and an exit face,
    said incident face and said exit face being inclined relative to each other so that a light incident substantially perpendicularly on said incident face is substantially perpendicularly emitted from said exit face.

3. An image forming optical system according to claim 2, wherein:
    refractive index of a first portion of said optical element longer in distance between said incident face and said exit face is lower than that of a second portion of said optical element shorter in distance between said both faces.

4. An image forming optical system according to claim 2, wherein:
    said optical system further comprises a plano-concave lens; and
    said optical element is a prism in which said optical element is connected to a plane face of said plano-concave lens and a surface of said optical element opposite to the cemented plane face is inclined to be normal to an optical axis, the refractive index of a first portion of said optical element longer in distance between said incident face and said exit face being lower than that of a second portion of said optical element that is shorter in distance between said both faces.

5. An image forming optical system according to claim 4, wherein;
    said plano-concave lens and said prism are formed as a single member.

6. An image forming optical system according to claim 1, wherein:
    said incident face and said exit face of said optical element are parallel to each other.

7. An image forming optical system according to claim 1, wherein:
    at least one of said incident face and said exit face is a curved surface.

8. An image formation optical system according to claim 6 or 7, wherein:
    said optical system further comprises a refracting prism for optical path conversion arranged on the side closer to an image than the position of said optical element, the refractive index of a first portion of said optical element on the side where an optical axis is curved being higher than that of a second portion of said optical element on the side opposite thereto.

9. An image forming optical system according to claim 6 or 7, wherein:
said optical system further comprises a prism for turning an optical axis at a right angle and a plano-concave lens directing a concave face toward an incident face of said prism and cemented to said incident face; and
said optical element is formed as a plane-parallel lens cemented to a plane face of said plano-concave lens, the refractive index of a first portion of said plane-parallel lens on the side where an optical axis is curved being higher than that of a second portion of said plane-parallel lens on the side opposite thereto.

10. An image forming optical system according to claim 9, wherein:
said plano-concave lens and said plane-parallel lens are formed as a single member.

11. An image forming optical system according to claim 6 or 7, wherein:
said optical system further comprises a prism for turning an optical axis at a right angle and a negative meniscus lens directing a concave face having larger curvature toward an exit face of said prism and cemented to said exit face; and
said optical element is formed as a plano-concave lens cemented to said negative meniscus lens, refractive index of a first portion of said plano-concave lens on the side where an optical axis is curved being higher than that of a second portion of said plano-concave lens on the side opposite thereto.

12. An image forming optical system according to claim 6 or 7, wherein:
said optical system further comprises a prism for turning an optical axis at a right angle and a first plano-concave lens directing a concave face toward an exit face of said prism and cemented to said exit face; and
said optical element is formed as a second plano-concave lens cemented to a plane face of said first plano-concave lens, the refractive index of a first portion of said second plano-concave lens on the side where an optical axis is curved being higher than that of a second portion of said plano-concave lens on the side opposite thereto.

13. An image forming optical system for forming an object image on a predetermined image forming position, comprising:
an image forming lens; and
a gradient refractive index optical element, said optical element being a prism arranged in a light transmitting portion of a non-flexible endoscope, and having a refractive index distribution in which the refractive index is linearly changed in a direction different from that of an optical path within a visual field in order to convert a visual field direction to another direction and the refractive index of an outside portion of an optical axis which curves through said prism is higher than that of an inside portion of the optical axis.

14. An image forming optical system for forming an object image on a predetermined image forming position, comprising:
an image forming lens; and
a gradient refractive index optical element, said optical element having a refractive index distribution in which the refractive index is linearly changed in proportion to the increase in distance from an optical axis of said image forming lens at the outside region except a center portion of said optical element which is located on said optical axis; said optical element being located closer to a light incident side than said image forming lens.

15. An image forming optical system according to claim 14, wherein:
said optical system further comprises an objective: and
said optical element is formed as a plane-parallel lens cemented to a front end face of said objective, said plane-parallel lens having a refractive index distribution which has a conical shape extended from the center of said lens toward the circumference, except the center portion.

16. An image forming optical system according to claim 14, wherein:
said optical system further comprises an objective: and
said optical element is formed as a plano-convex lens cemented to a front end face of said objective, said plano-convex lens having a refractive index distribution which has a truncated cone shape extended from the center of said lens toward the circumference.

17. An image forming optical system for forming an object image on a predetermined image forming position, comprising:
an image forming lens; and
a gradient refractive index optical element, said optical element having an incident face and an exit face, and having a circular arc region including portions of said incident and exit faces with the index of refraction of said circular arc region varying linearly along the radius of said circular arc region.

18. An image forming optical system for forming an object image on a predetermined image forming position, comprising:
an image forming lens; and
a gradient refractive index optical element, said optical element having a refractive index distribution in which the refractive index is linearly changed in a direction crossing an optical axis of said image forming lens at the region including a center part of said optical element which is located on said optical axis and is nonlinearly changed outside of said region.

19. An imaging optical system for endoscope, comprising: an objective unit;
an image transmitting optical system transmitting an image formed through said objective unit; and
a gradient refractive index optical element,
said optical element having a refractive index distribution in which the refractive index is linearly changed in proportion to the increase in distance from an optical axis of said objective unit at the outside region except a center portion of said optical element which is located on said optical axis;
said optical element being located at a position within said image transmitting optical system.

* * * * *

UNITED STATES PATENT AND TRADEMARK OFFICE
CERTIFICATE OF CORRECTION

PATENT NO. : 4,895,433

DATED : January 23, 1990

INVENTOR(S) : TAKAHASHI et al.

It is certified that error appears in the above-identified patent and that said Letters Patent is hereby corrected as shown below:

Column 10, line 43, change "connected" to --cemented--.

Signed and Sealed this

Twenty-eighth Day of May, 1991

*Attest:*

HARRY F. MANBECK, JR.

*Attesting Officer*          *Commissioner of Patents and Trademarks*